US011358695B2

(12) United States Patent
Kontopoulos

(10) Patent No.: US 11,358,695 B2
(45) Date of Patent: Jun. 14, 2022

(54) DIVIDED GEAR WHEEL FOR A POWER TRANSMISSION SYSTEM USED IN A MARINE ENGINE

(71) Applicant: Leonidas Kyros Kontopoulos, Frankfurt am Main (DE)

(72) Inventor: Konstantinos Kontopoulos, Frankfurt am Main (DE)

(73) Assignee: Leonidas Kyros Kontopoulos, Frankfurt am Main (DE)

( * ) Notice: Subject to any disclaimer, the term of this patent is extended or adjusted under 35 U.S.C. 154(b) by 0 days.

(21) Appl. No.: 16/718,376

(22) Filed: Dec. 18, 2019

(65) Prior Publication Data

US 2021/0188412 A1 Jun. 24, 2021

(51) Int. Cl.
*B63H 20/20* (2006.01)
*B60K 17/02* (2006.01)

(52) U.S. Cl.
CPC ............. *B63H 20/20* (2013.01); *B60K 17/02* (2013.01)

(58) Field of Classification Search
CPC ................................. B60K 17/02; B63H 20/20
See application file for complete search history.

(56) References Cited

U.S. PATENT DOCUMENTS

| 1,162,305 | A | * | 11/1915 | Nowak | F16D 3/12 74/339 |
| 1,941,360 | A | * | 12/1933 | Mathias | B63H 23/08 440/63 |
| 4,437,552 | A | * | 3/1984 | Toyama | G03B 3/10 192/81 C |
| 4,589,296 | A | * | 5/1986 | Sato | F16H 57/0006 74/411 |
| 2014/0116174 | A1 | * | 5/2014 | Sandner | F16H 57/12 74/440 |
| 2015/0072813 | A1 | * | 3/2015 | Yoon | F16H 55/36 474/94 |
| 2017/0248171 | A1 | * | 8/2017 | Kawamura | G03G 15/757 |
| 2018/0248373 | A1 | | 8/2018 | Monden et al. | |
| 2020/0166103 | A1 | * | 5/2020 | Kontopoulos | F16H 55/17 |
| 2021/0188412 | A1 | * | 6/2021 | Kontopoulos | B63H 20/20 |
| 2021/0239188 | A1 | | 8/2021 | Kontopoulos et al. | |
| 2021/0310542 | A1 | | 10/2021 | Kontopoulos | |

FOREIGN PATENT DOCUMENTS

| CN | 101463877 B | 9/2012 |
| CN | 108374868 B | 6/2019 |
| DE | 219963 C | 3/1910 |
| EP | 3025072 B1 | 12/2018 |

(Continued)

OTHER PUBLICATIONS

International Preliminary Report on Patentability for International Application No. PCT/EP2020/065023 dated Jan. 6, 2022.

*Primary Examiner* — S. Joseph Morano
*Assistant Examiner* — Jovon E Hayes

(57) ABSTRACT

The present application relates to power transmission system used in marine engines and in particular to a divided gear wheel (11, 12), for a power transmission system 1,2, used in marine engines, to a power transmission system used in marine engines to a method to operate said power transmission system and to a marine engine comprising a power transmission system.

10 Claims, 8 Drawing Sheets

(56) References Cited

FOREIGN PATENT DOCUMENTS

| | | |
|---|---|---|
| EP | 3660352 A1 | 6/2020 |
| EP | 3757425 A1 | 12/2020 |
| FR | 2946291 B1 | 11/2012 |
| JP | 2009-171688 A | 7/2009 |
| JP | 2016-36252 A | 3/2016 |
| JP | 2018-46656 A | 3/2018 |
| KR | 10-2016-0141591 A | 12/2016 |
| WO | WO 2006/089316 A1 | 8/2006 |
| WO | 2008/062192 A1 | 5/2008 |
| WO | WO-2008062192 A1 * | 5/2008 ............. F16D 11/10 |
| WO | WO 2014/056097 A1 | 4/2014 |
| WO | WO 2017/016869 A1 | 2/2017 |
| WO | 3757424 A1 | 12/2020 |
| WO | WO 2020/259955 A1 | 12/2020 |
| WO | WO 2020/259964 A1 | 12/2020 |

* cited by examiner

DIVIDED GEAR WHEEL FOR A POWER TRANSMISSION SYSTEM USED IN A MARINE ENGINE

FIELD OF THE INVENTION

The present application relates to the field of power transmission systems used in marine engines and in particular to a divided gear wheel for a power transmission system used in marine engines, to a power transmission system used in marine engines, to a method to operate a power transmission system used in marine engines and to a marine engine comprising a power transmission system.

BACKGROUND

Known marine engines, such as a propulsion system for boats or the like, use power transmission systems (e.g. gearboxes) in order to change the direction of rotation of the propeller during the movement of the boat, and as a consequence the boat can move forwards or backwards. As a result there are three states: forward, backwards and neutral.

Most power transmission systems for outboard motors or inboard/outboard motors, adapted in boats, are consisted of two bevel gears assigned to the output shaft and one bevel pinion assigned to the input shaft engaging both bevel gears.

In most boats the same lever is the one that controls both the throttle and the power transmission system. Therefore when the throttle lever is pushed from neutral, forward, the front gear wheel is engaged. Therefore a forward movement is achieved. When we want to move backwards, the throttle lever is pulled from the neutral position backwards, resulting in a gear change. In between that change the throttle lever must stay in the neutral position for a while (pause) in order not to damage the power transmission. An analogous operation is achieve when two levers are adopted, with the one selecting gears and the other operating the throttle.

Therefore when the captain moves the boat forwards, the dog clutch type selector engages the one of the bevel gears and when a backwards movement is desired, the throttle lever is pulled backwards. The throttle lever stays for a while in the neutral position (pause) until the propeller shaft (prop shaft) does not rotate or rotates with very few revolutions per minute (boats' lowest speed) and then the reverse gear is selected.

The demand for the pause in the neutral state between every gear change is a consequence of the absence of a clutch and a synchronizing mechanism. If a clutch and a synchronizing mechanism were incorporated the gear changing action would be faster and the pause in the neutral state would not be obligatory. Gears are constantly rotating when shifting occurs, and as a result, dog clutch teeth are subjected to some wear and tear forces and as a result if there was no pause in the neutral state the power transmission system could end up broken.

Thus, it is the object of the present application to provide a power transmission system, particularly for marine engines, that at least partly overcomes the aforementioned drawbacks of the obligatory pause in the neutral stage between every gear change and less gear wear. In particular, the power transmission system used in marine engines of my proposal, allows for a quicker and smoother shifting with less gear wear. Additionally the divided gear wheel of my proposal operates as a double mass flywheel, with analogous advantages. The power transmission system is adopted in a marine engine that can be either an inboard or an outboard motor with the outboard explained in detail further on, and the adaptation in an inboard motor, being analogous to the presented one.

Similar patents to the presented one are published with the following numbers:

In the patent document U.S. Ser. No. 11/62,305/30 Nov. 1915 a divided gear wheels with one elastic element is presents. It is well known that without a synchronizing mechanism the engagement is not possible. This mean that when there is an absence of clutch disks (in my proposal there is no need for clutch disks), the difference in angular velocities between the engaging parts that are going to be engaged have to be significantly small (<20 rpm). Otherwise the engagement via the dog clutch would not take place and the dog clutch teeth will be damaged. Due to the fact that the divided gear wheel has only one elastic element, the spring constant of said elastic element has to be great (in case a small spring constant was chosen the elastic element would be plastically deformed). In my proposal the divided gear wheel comprises two elastic element with one element having a small spring constant (adapted to handle less than the 0.3% of the maximum applied torque) and one having a greater spring constant for handling the maximum load. The first elastic element (small spring constant) contributes to a smooth engagement and the second elastic element (greater spring constant) handles the occurring load.

In the patent document WO 2008/062192/29 May 2008, the inner/outer parts of the divided gear wheel are connected with the help of resilient means, positioned in a in series arrangement to overcome torque peaks that may occur during the engagement and therefore acting as damping elements. The presented method is a passive method to overcome the torque peaks when the engagement takes place.

The engagement takes place when the dog clutch teeth enter the large engagement windows and when the dog clutch teeth meet the surface of the inner part of the divided gear wheel, loud grinding noise occurs additionally to the occurring torque peaks. This may damage the divided gear wheel or the dog clutch selector and this is the reason why resilient means are adopted.

In case where a normal teething instead of large engagement windows was adopted, the dog clutch selector may refuse to engage or could end up with damaged engagement means (teeth).

When the resilient means are adopted in a series arrangement the applied total load is the same for each one of the resilient elements. As it is well known every elastic element has an allowed deformation limit. If this limit is surpassed the element is plastically deformed and therefore ends up not being operational. Therefor the differences in the spring constant between the resilient means or springs in a series configuration cannot be great.

In my proposal the parallel positioning and the difference in the length of the elastic elements allow for different spring constants that allow the completion of the engagement of the inner part of the divided gear wheel without causing any damage to the engagement means (teeth). Depending on engines torque and shafts acceleration the demanded ratio between 1st springs resistance force during engagement and rotational force needed to handle the load is about $\frac{1}{1000}$ in order to have smooth engagement and to have the demanded rotational force in order to handle the load as will be described with details farther on.

In the patent document DE219963 two concentric wheels connected with elastic elements are claimed and not a divided gear wheel. In this patent the softer elastic element is used in order to handle the occurring load and the stiffer elastic element in order to handle any occurring torque peaks. It is a way to overcame torque shocks.

In my proposal there is a parallel positing in the elastic elements and a difference in length between the elastic elements that have different spring constants. The elastic element with the smaller spring constant that is longer in relation to the elastic element with the greater spring constant after its initial deformation, does not bear any significant load. The handling of the load of the elastic element with the smaller spring conic, stant is less than the 0.1% of the maximum occurring load and it is used in order to achieve a smooth engagement between the inner part of the divided gear wheel and the dog clutch type selector which is torque proof engaged with the assigned shaft. The elastic element that is shorter in relation to the initially deformed elastic element has a greater spring constant and it is assigned with the main handling of the load.

In addition the inner part of the divided gear wheel is partially arranged within the outer part and therefore less space is demanded. The outer part comprises a gear teething adapted to engage with other gear wheels and the inner part comprises engagement means adapted to engage with the dog clutch type selector or any other suitable engagement component.

The set of two elastic elements can comprise a first longer spring element having a smaller spring constant and a second shorter elastic element comprising resilient means (e.g. rubber block) adapted to transfer the greater part of the occurring load.

SUMMARY

In order to surpass the aforementioned drawbacks of a power transmission system for a marine engine, our innovation proposes the replacement of the bevel gears with divided bevel gear wheels.

The divided bevel gear wheel is consisted by an inner part, being engageable with a shaft and an outer part, comprising a bevel gear teething, constantly meshing with the provided bevel pinion. The inner part and the outer part have a common rotational axis. Further, the inner part is at least partially arranged within the outer part and the inner part is coupled to the outer part by means of at least one set of two elastic elements, so that the inner part is arranged angularly deflectable with respect to the outer part around the common rotational axis.

The outer part meshes with the provided drive bevel pinion.

The outer part and the inner part comprise supports that "hold" the set of two elastic elements. The inner part and the outer part, form a compartment wherein the set of two elastic elements is placed. As it is obvious the number of compartments and the number of supports is in relation to the received number of sets of elastic elements.

The support of the outer part (outer support) can be received in cavity created in the support of the inner part (inner support) or vice versa with an according formation of said supports. In addition one support can comprise a back that stops the other support upon deflection of either the inner or the outer part and as a result restricts the rotation range. Furthermore this back can comprise a padding with a damping effect in order to prevent the fierce collision of the inner and outer parts. In an alternative the support cannot comprise a back, but in this case damping elements should exist for eliminating inner part oscillation.

The inner part is engageable with a shaft, such as a prop shaft or a drive shaft. The engagement is temporally and is achieved with the help of a dog clutch type selector. Since the engagement is established temporarily, the inner part may comprise engagement means (e.g. teeth) that are adapted to engage with the engagement means of the dog clutch type selector, wherein the dog clutch type selector temporarily fixes the inner part of the divided bevel gear so as to rotate with the prop shaft. Accordingly, rotational forces and/or torque can be transferred from the inner part to the shaft and vice versa via the set of two elastic elements. The engagement means can be provided on an inner circumferential surface of the inner part, facing an assigned shaft. Further, engagement means can be provided on a front face of the inner part of the divided bevel gear wheel. The engagement means can comprise grooves and/or recesses.

As the inner part is deflectable with respect to the outer part and is coupled to the outer part by a set of two elastic elements, differences in angular velocity during a gear ratio changing action can be compensated.

The maximum deflection angle of the inner part is inter alia dependent on the number of sets of two elastic elements used. If only one set of two elastic elements is provided, the maximum deflection angle may be above 180°, e.g. in a range of 180° to 230°. In case of multiple sets of two elastic elements that are arranged evenly distributed in a circumferential direction, the maximum deflection angle, and thus the available engagement time, is reduced.

The set of two elastic elements may be spring elements and may be positioned within a spring compartment, formed by the inner part and the outer part, in between the inner and outer supports. Alternatively each spring can be positioned in a separate compartment but in any case the set of two elastic elements will be positioned in an arrangement that allows the one elastic element to be initially deformed upon deflection of the outer part in relation to the inner part of the divided bevel gear wheel and the deformmation of the second elastic element will follow after the progression of the deflection, with the first elastic element being longer in relation to the second elastic element. In particular, the spring compartment can be a closed compartment. Alternatively, the spring compartment may be an open compartment that allows heat exchange and a facilitated maintenance of the springs.

The outer part can transfer rotational force and/or torque to the inner part via the set of two elastic elements and vice versa. When the inner part is angularly deflected with respect to the outer part the corresponding set of two elastic elements is compressed or decompressed, depending on the direction of deflection and the arrangement of the set of two elastic elements.

Two elastic elements are provided with only the first elastic element (longer elastic element) being in constant contact with both the inner and the outer parts of the divided bevel gear wheel. The 1st elastic element is in constant contact and the 2nd will be in contact after the deflection of one of the inner or outer parts, since it is shorter in relation to the other elastic element. It is going without saying that more than one set of two elastic elements can be adapted with each of the additional sets of two elastic elements behaving similarly to the one described above. The terms shorter and longer, describing the elastic elements consisting each set of two elastic elements, are a reference in the length of the elastic elements when the elements are not loaded by the deflection of one of the inner and outer parts (Neutral position). Therefore the reference length is the installed length of the first spring element and the free length of the other elastic element, when the divided gear wheel is not engaged to the assigned shaft. Furthermore the inner and the outer part are adapted to rotate with the same angular speed if the set of two elastic elements is fully loaded under the occurring load.

The elastic elements consisting the set of two elastic elements can be spring elements, such a torque springs or a spiral springs, torsional springs, or any other elastic elements such as rubber blocks etc. Further, different types of elastic elements can be combined in a divided bevel gear in order to achieve a desired spring characteristic.

For example each set of two elastic elements is consisted by a first and a second spring element, with the spring constant of the first spring element may be lower than the spring constant of the second spring element. The first spring element is longer than the stiffer spring element and it will start to be compressed initially upon engagement of engagement means of the dog clutch type selector with the engagement means of the inner part of the divided bevel gear, providing the required time in order to achieve a complete engagement before the second spring element begins to bear load. Alternatively a combination of springs and elastic elements (such as rubber blocks) can be used consisting the set of two elastic elements, with the first element that is initially deformed (smaller spring constant) being for example the spring element and the second element being the elastic element (e.g. rubber block with greater spring constant) by which the main handling of the load is being achieved.

Particularly, a first spring element may be partially arranged within a second spring element and may protrude out of the second spring element on a front face, wherein a spring constant of the first spring element will be lower than the spring constant of the second spring element. The exemplary set of spring elements will comprise one spring element having a bigger diameter concentrically placed to a spring element having a smaller diameter. As mentioned above in an alternative configuration the set of spring elements may be positioned in different compartments but always the softer spring element will be in constant contact with both the inner and the outer parts of the divided bevel gear and will be deformed initially, with the deformation of the second elastic element (stiffer) following, after the progression of the deflection of the components and the deformation of the first spring element. The 1st (longer, softer) spring element is adopted in order not to allow the relative motion between inner/outer part of the divided gear wheel when inner part is not engaged with the assigned shaft, no matter if inner or outer part accelerates or decelerates or both rotate with the same angular velocity (neutral position).

For example when a torsional spring is used the 1st (softer) spring is preloaded so that: Where $T_{pre}$ is the preloaded torque of the spring, J is the moment of inertia of the inner part of the divided bevel gear, $\omega_{max}$ is the maximum angular acceleration/deceleration that can be achieved by the inner part of the divided bevel gear and $T_f$ is the torque created by friction forces between the inner part and the assigned shaft. The preloaded spring is adapted in order to have negligibly deformed first elastic element before the engagement, regardless if the components accelerate, decelerate or both rotate with a constant angular velocity. As a result when the divided bevel gear is not engaged with the dog clutch type selector, stays in a neutral position with the softer spring element being negligibly deformed, despite any occurring acceleration or deceleration of the inner/outer part, due to the existence of the preloaded softer spring.

Alternatively as a person skilled in the art understands, the so called neutral position can occur without the softer spring being preloaded, but in that case a higher spring constant (k) in comparison to the spring constant of the preloaded spring have to be adopted.

The second spring element is shorter than the first spring element and it will start to be compressed after the completion of the engagement of the engagement components (i.e. dog clutch type selector and inner part of the divided bevel gear). The second spring element is the one that transfers rotational forces and/or torque, handling the occurring load. It is obvious that the softer spring element also transfers some rotational force and/or torque but due to the fact that the spring constant, in relation to the spring constant of the second elastic element, is very small (<<k) the rotational forces and/or torque being transferred via the softer spring element is insignificant, despite the deformation of the elastic element. The spring constant (k) of the second (stiffer) elastic element is in relation to the maximum torque provided by the motor.

As it is apparent, the existence of the softer spring element contributes to a smooth engagement, and the existence of the stiffer spring element contributes to the power transfer after the completion of the engagement.

As a person skilled in the art understands, due to the fact that the moment of inertia of the inner part of the divided bevel gear is very small and friction forces are negligible, a significantly small spring constant (k) and $T_{pre}$ is demanded, and therefore a smooth effortless engagement between the engagement components (i.e. dog clutch type selector and inner part of the divided bevel gear) can be achieved, without damaging the engagement means (i.e. teeth).

The existence of a set of two elastic elements adapted in a parallel positioning, with the first spring element with a smaller spring constant being initially deformed upon deflection and the deformation of the second elastic element with the greater spring constant in relation to the spring constant of the first elastic element following, is a key feature of the proposed innovation since the role of the two elements is different. The initially deformed element contributes to a smoother engagement and provides the necessary time in order the engagement to take place, and the second elastic element is the one that the transfers the torque according to the occurring load.

As it is well known, every elastic element has a certain deformation limit. When this limit is surpassed, the element loses its elastic characteristics and therefore it is no longer functional.

In my proposal, the positioning of the set of two elastic elements contributes to this feature, due to the fact that the deformation of the first spring element is independent from the deformation of the second elastic element, with the one element being parallel to the other.

In other innovations comprising divided gear wheels, the positioning of the elastic element is in a series configuration and therefore the same force is applied to all the elastic elements of the series. This restricts having a great difference in the spring constants of each element being part of said otherwise the danger of plastically deforming one of the elements is present.

In my proposal the parallel positioning of the elastic elements having different lengths and different spring constants allows loading the first spring element independently from the second elastic element. In addition the first spring element transfers a very small amount of the applied rotational force upon deforming, and the second elastic element transfers the greater amount of the applied rotational force.

Published patent documents relevant to the proposed marine power transmission system are:

U.S. Ser. No. 11/62,305/30 Nov. 1915, seems to adapt a compensating gear in a power transmission system but this compensating gear comprises only a single elastic element. By incorporating only one elastic element the smooth engagement is not achievable since the spring constant of this single elastic element is great in order to handle the provided torque. As mentioned before a small spring constant is needed in order to have a smooth engagement and not damaging the engagement means of both the inner part of the divided gear wheel and the engagement means of the engagement component. In case an elastic element with small elastic constant was adapted, the danger of plastic deformation is present as a result a set of two parallel elastic elements has to be adopted.

Another patent document where two parallel positioned elastic elements are adopted is the German patent DE219963. This patent refers to two concentric wheels being connected via elastic elements. The longer elastic element is the one that transfers the rotational force and/or torque and therefore connects the two concentric wheels and the second shorter elastic element (with the greater spring constant) is positioned in order to "cushion" any sudden torque peaks.

Another patent document of a power transmission system that incorporates divided gear wheels is the one presented in the International application WO 2008/062192/29 May 2008. In this document, in case normal gear teething was adopted instead of large engagement windows, the engagement means could end up damaged. The large engagement windows are the ones that provide the necessary time for the completion of engagement but an argue of engagement could take place or engagement mean damage can be present. This is the reason why resilient means are included. The resilient means are in a series configuration. As it is well known every elastic element has an allowed deformation limit. That is the reason why the differences in the spring constants cannot be great. As a result if the spring constant of a resilient mean being adopted in a series configuration, is assigned for a smooth engagement (soft spring) the danger exists that the allowed deformation limit is surpassed. In a scenario where the spring constant of the resilient means is sufficient in order not to be permanently deformed, the previously mentioned drawbacks of noise presence and/or damaged engagement means would again being present.

The only way to surpass this drawback is by adopting two elastic elements (one longer softer and one shorter stiffer in parallel configuration as presented in my proposal.

The initially deformed elastic element having the very small spring constant allows a smooth engagement and provides the necessary time in order to complete said engagement, and the following deformation of the second elastic element having a greater spring constant in relation to the spring constant of the first elastic element, accompanied by a simultaneous continuing deformation of the first spring element, is the one that transfers the rotational force/torque according to the occurring load.

The objects are further at least partly achieved by a power transmission system used in marine engines, that comprises a drive shaft, supporting a bevel pinion and a prop shaft, supporting divided bevel gear wheels as described above. The bevel pinion of the drive shaft, engages with two corresponding bevel gear wheels of the prop shaft. The power transmission system used in marine engines further comprises one dog clutch type selector being engageable with the divided bevel gears, assigned to the prop shaft and to both the divided bevel gear wheels. The dog clutch type selector is arranged concentrically to the prop shaft, torque proof fixed but axially movable along the prop shaft to engage a gear ratio, wherein the dog clutch type selector is adapted to engage with the inner part of the divided bevel gear wheel, thereby torque proof fixing the inner part with the prop shaft.

The drive shaft may be powered by an engine and the prop shaft may be adapted to power the marine propeller of a boat. By engaging the dog clutch type selector with an assigned divided bevel gear wheel, the inner part of the divided bevel gear wheel is torque proof fixed to the prop shaft. By this engagement of the dog clutch type selector with the inner part of the divided bevel gear power transfer can be achieved. Accordingly, by engaging the inner part of the other divided bevel gear an opposite rotation can be achieved.

In an initial state, the power transmission system used in marine engines may operate with the inner part of the first divided bevel gear engaged to the prop shaft with the help of the dog clutch type selector. Accordingly, power is transferred from the drive shaft to the prop shaft by means of a first divided bevel gear since the set of two elastic elements inside the first divided bevel gear is fully loaded (in relation to the occurring load). As mentioned before the drive shaft has a bevel pinion constantly meshed to both the divided bevel gears and therefore since the first divided bevel gear is selected, power is transferred via the first divided bevel gear to the prop shaft.

Assuming that the boat is moving forward. Rotational force and/or torque is transferred from the drive pinion to the outer part of the divided bevel gear. The outer part of the divided bevel gear transfers the rotational force and/or torque to the spring elements connecting the outer part and the inner part and as a consequence these spring elements are being compressed, transferring the rotational force and/or torque to the inner part of the divided bevel gear through the elastic elements. Since the inner part of the divided bevel gear is torque proof engaged with the prop shaft due to the engagement with the dog clutch type selector, power is transferred from the engine to the propeller.

Now let's assume that the captain wants to engage the reverse gear. In common power transmission systems used in marine engines, the throttle lever is pushed backwards in a neutral position. The gear selector stays in neutral position for a while (pause) in order to minimize the difference in angular velocities between the prop shaft and the gear assigned to the reverse movement. After the pause, the reverse gear can be selected by engaging the assigned gear wheel with a corresponding movement in the gear selector.

In my proposal the mandatory pause in every gear change is not obligatory and without pausing in the neutral state the reverse gear can be engaged. This is a result of the adaptation of divided bevel gears. Since the engagement with the help of a dog clutch type selector, takes place only with the inner part of the divided bevel gear, which has a small inertia and due to the fact that the resistance of the softer spring which compresses initially, is very small, the engagement can be direct, resulting in a quick, smooth gear change without damaging the gears and the dog clutch.

As mentioned above due to the fact that inertia of the inner part of the divided bevel gear is very small and the spring constant of the softer spring that is initially deformed is also small, a smooth and quick engagement can be achieved, by compressing the softer spring and can be completed before the beginning of compression of the stiffer spring. After the engagement is completed, the compression of the stiffer spring initiates by a progressive handling of the occurring load, with the amount of compression depending on the occurring load.

In addition because engine stall is not desired, angular velocity sensors could be added. By this addition, the throttle is automatically adjusted in relation to the rotations of the shafts and the divided bevel gears. Sensors measure the angular velocities of the divided bevel gears and the shafts, adjusting the throttle in order not to experience any stalling.

In case bevel gears where used instead of divided bevel gears, the inertia during the gear change would be the inertia of the entire system with an immediate handling of the occurring load, and not the inertia of the inner part of the divided bevel gear with a progressive handling of the occurring load as in my proposal.

As mentioned previously the throttle lever and the gear lever coexist, with the position of the throttle lever (either pushed away from the captain or pulled towards the captain) controlling the throttle and the direction of movement of the boat. Every gear changing action takes place with the movement of the throttle lever that is connected to the dog clutch type selector. Therefore by a corresponding movement of the throttle lever, the dog clutch type selector moves axially forwards or backwards, selecting the desired divided bevel gear. The shifting mechanism can also be electrical, mechanical or hydraulic.

The objects are further at least partly achieved by a method for operating a power transmission system used in marine engines, with the method comprising the following steps: Rotating the drive shaft and transferring power to the prop shaft by means of a first gear ratio (e.g. forward). Commanding a gear ratio changing action from a first gear ratio (e.g. forward) to a second gear ratio (e.g. backward), by a corresponding move of the throttle lever which controls both the throttle and the gear change. Axially moving the dog clutch type selector, as a result of the movement of the throttle lever, and thereby disengaging the inner part of the divided bevel gear wheel of the selected gear ratio from the torque proof fixing with the shaft and engaging the inner part of the divided bevel gear wheel of the second gear ratio (backward movement), thereby torque proof fixing the inner part of the divided bevel gear assigned to the second gear ratio with the shaft, wherein the inner part of the divided bevel gear wheel of the second gear ratio is angularly deflected with respect to the outer part and loads the first elastic element which has a smaller spring constant in relation to the second elastic element. The first elastic element starts to deform significantly when the engagement of the inner part of the divided bevel gear initiates and continues to deform up till the engagement is completed and before the deflected component reaches the second elastic element with the higher (in relation to the first elastic element) spring constant. Then the deformation of the first elastic element continues but is accompanied by the deformation of the second elastic element, which deforms and transfers power to the prop shaft. The power is resumed (depending on the needs) when the engagement of the components (dog clutch type selector and inner part of the divided bevel gear) initiates. Rotating the drive shaft and transferring power to the prop shaft by means of the second gear ratio. It is going without saying that the method for going from the second gear ratio (backwards) to the first gear ratio (forwards) is analogous to the one described.

In an alternative the splines that torque proof engaged the dog clutch type selector with the shaft, guiding the axial movement of the dog clutch type selector can be helical instead of linear. As a consequence the dog clutch type selector will additionally rotate when axially moving, contributing in a smaller difference in angular velocities between the two engaging components, and therefore achieving an even smoother engagement. In this case the shifting mechanism would have to secure the engagement of the two components with the help of a securing mechanism (e.g. a worm gear mechanism, a hydraulic mechanism etc.).

In the presented layout the described configuration comprises divided bevel gears with the outer part comprising a bevel gear teething mainly adopted in a power transmission system of outboard motors. This is not restrictive since other types of gear teething can be adopted instead of a bevel gear teething, with the outer part comprising other types of teething and an according change to the teething of the pinion and to the layout in general has to take place and therefore can be adopted in other types of marine engines such as inboard motors or in other applications. For example the pinion can be a spur gear and the outer part of the divided gears can comprise a face gear teething, with the pinion simultaneously engaged in both the face gear teething of the outer parts of the divided gears. A similar alternative design adopted in an inboard motor, will be described in greater detail further on. Therefore the so called divided bevel gear is not restrictive and can be generalized and be called divided gear wheel.

Moreover the engagement can take place with any suitable engagement component and not necessarily with the dog clutch type selector presented which plays the role of the engagement component in the presented configurations.

Furthermore the presented gear change occurs with a manual gear lever but the gear changing action can occur with any type of known shifting mechanisms such as mechanic, hydraulic, or electric shifting mechanism.

The objects are further at least partly achieved by a boat comprising a divided bevel gear wheel or a power transmission system used in marine engines as described above.

BRIEF DESCRIPTION OF THE FIGURES

In the following, preferred embodiments of the present invention are described with respect to the accompanying figures.

DETAILED DESCRIPTION

As will become apparent from the following, the present application allows to provide a power transmission system used in marine engines that changes gear ratios faster and smoother due to the absence of a pause in the neutral stage between every gear change and due to the existence of a softer spring that compresses initially upon engagement (selection of the gear ratio). In addition the proposed power transmission system used in marine engines achieves less gear wear and provides damage protection, as a result of the stiffer spring, in case sudden torque peaks occur (e.g. the propeller is stuck in sand or encounters a tree branch etc.) playing also the role of a double mass flywheel.

Figure 1:
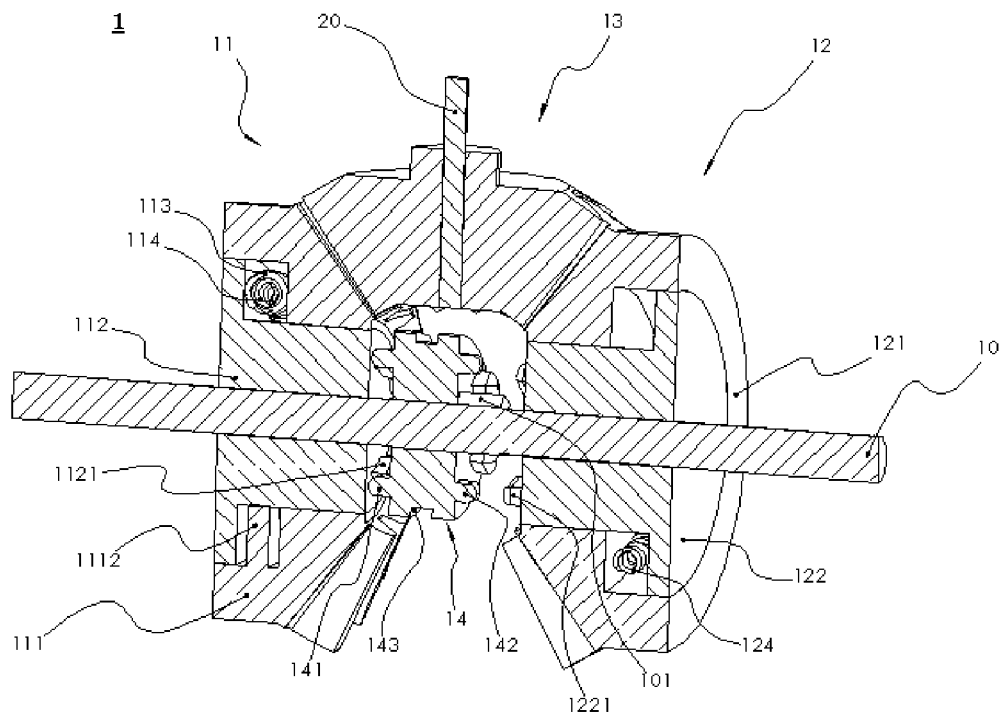
FIG. 1 is a schematic illustration of a sectional view of a power transmission system used in marine engines according to a first embodiment of the invention.

FIG. 1 is a sectional view of a power transmission system 1 of an outboard motor, according to an embodiment of the invention. As can be seen, the power transmission system 1 is consisted by one bevel pinion 13, a first divided bevel gear 11 and a second divided bevel gear 12. Both the first and the second divided bevel gears 11, 12 are constantly meshed with the bevel pinion 13, and their main axis form a 90° angle.

Bevel pinion 13 is torque proof fixed with a drive shaft 20 that receives power from the engine. Divided bevel gears 11, 12 are supported by prop shaft 10 which has a marine propeller torque proof fixed with the shaft in one end.

Divided bevel gears 11, 12 are consisted by an inner part 112, 122 and an outer part 111, 121. Both the divided bevel gears 11, 12 are supported by the prop shaft 10 but are not constantly torque proof fixed with the prop shaft 10 and therefore are free to rotate when not engaged to the shaft.

The torque proof connection of the inner part 112 to the prop shaft 10 is achieved by the dog clutch type selector 14 which interacts with the inner part 112, 122 of the divided bevel gears 11, 12. Dog clutch type selector 14 is positioned in between the divided bevel gears 11, 12 and is assigned to both the divided bevel gears. Dog clutch type selector 14 is provided as torque proof fixed to the assigned shaft but has the ability to be moved axially.

Dog clutch type selector 14 has a gear selector coupling 143 which is coupled to the throttle lever that controls the axial position of the dog clutch type selector 14. By moving the throttle lever in the according position, dog clutch type selector 14 engages either the first divided bevel gear 11 or the second divided bevel gear 12. Additional the dog clutch type selector 14 may not interact with any of the divided bevel gears 11, 12 by staying in a neutral position in between the divided bevel gears 11, 12.

The dog clutch type selector 14 has engagement means 141, 142 facing each divided bevel gear 11, 12. As can be seen engagement means 141 are assigned to divided bevel gear 11 and engagement means 142 are assigned to the divided bevel gear 12. The engagement means 141, 142 are presented as protrusions but it is going without saying that can be cavities or a combination of both in accordance to the engagement means 1121, 1221 of the inner parts of the first and second divided bevel gears 11, 12. In addition preferably both the engagement means 1121, 1221 of the first and second divided bevel gears 11, 12 and the engagement means 141, 142 of the dog clutch type selector 14, will be consisted by a great number of teeth. This is preferred due to the fact that a collision between the engagement means 141, 142 and the front face of the inner parts 112, 122 of the divided bevel gears 11, 12 is not desired, and therefore a great number of teeth is preferred with each teeth having a pointed face which facilitates the engagement. When the engagement means 141, 142 and the engagement means 1121, 1221 meet the significant compression of the softer springs 114, 124 will begin. It is going without saying that engagement means 141, 142 are in accordance with engagement means 1121, 1221 in relation to their number, form, engagement surfaces etc. In addition the provision of a great number of engagement means, in both the inner parts 112, 122 and in the dog clutch type selector 14, decreases the demanded tooth depth of the engagement means.

Therefore it is made clear that the decreased occurred inertia (due to the fact that initially upon engagement, only the inner parts 112, 122 of the divided bevel gears 11, 12 take part in the engagement/gear selection) accompanied by the softer springs 114, 124 result in a quicker and smoother gear change.

Divided bevel gear 11 is consisted by an inner part 112 supported by the prop shaft 10, free to rotate when not engaged to the prop shaft 10 by the dog clutch type selector 14, and an outer part in that is supported by the inner part 112. The outer part in has a bevel gear teething on its outer surface which meshes with the bevel pinion teething of the bevel pinion 13. Both parts are coupled by one set of springs (two springs in total) where the set is consisted by one spring that has a smaller spring constant and protrudes on a front face of a second spring that has a greater spring constant. In the presented illustration, springs are positioned concentrically to each other with the first elastic element protruding out of the second elastic element on a front face, and are housed in a spring compartment formed in between the inner part 112 and outer part 111. As mentioned before each spring consisting the set of springs can be positioned in a separate compartment but always the divided bevel gear will behave as described. The inner part 112 and the outer part 111 have the ability to deflect angularly in relation to each other up till the set of springs is fully loaded. When the set of springs is fully loaded both the inner part 112 and the outer part 111 rotate with the same angular velocity. Similarly divided bevel gear 12 is consisted by an inner part 122 and an outer part 121.

Figure 2:
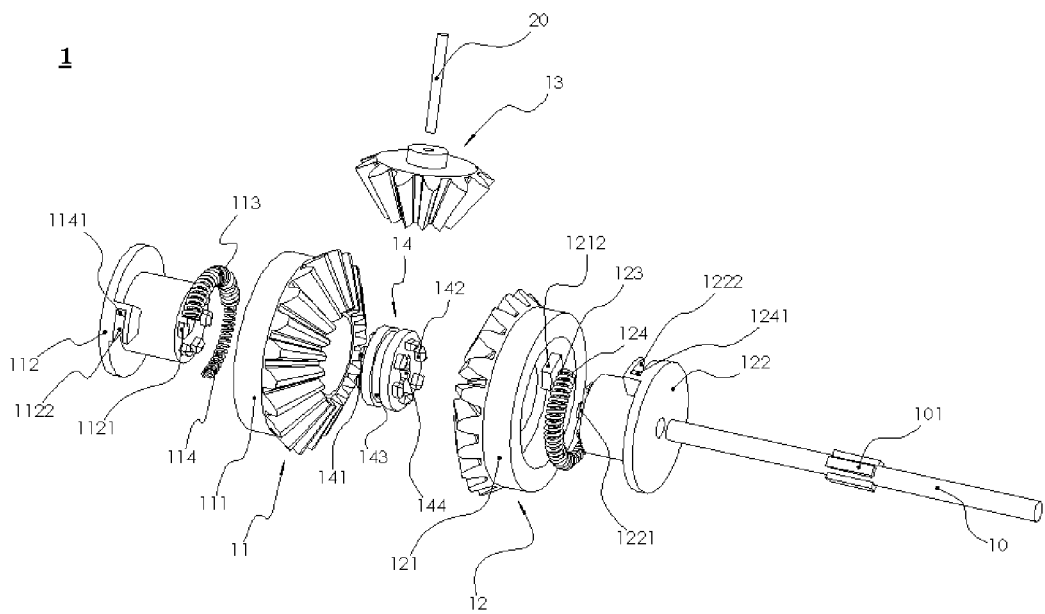
FIG. 2 individual parts of the power transmission system used in marine engines according to the first embodiment illustrated in FIG. 1.

FIG. 2 demonstrates individual parts of the proposed power transmission system of an outboard motor. In this figure a more clear view of the parts consisting the proposed power transmission system used in marine engines can be seen.

As mentioned before the dog clutch type selector 14 is torque proof fixed with the prop shaft 10 but has the ability to slide axially depending on the position of the throttle lever, engaging and disengaging the desired gear ratio. The engagement to the shaft takes place with the provision of an engagement surface 144 on the inner cylindrical face of the dog clutch type selector 14 that is in accordance with the guiding means 101 of the prop shaft 10 which extends for a suitable length in relation to the distance of the first and second divided bevel gears 11, 12.

When the first gear ratio is desired, an according movement of the throttle lever, positions the dog clutch type selector 14 towards the position of the first divided bevel gear 11. As a consequence the engagement means 141 of the dog clutch type selector 14 interact with the engagement means 1121 positioned on the front surface of the inner part 112 of the divided bevel gear 11, facing the engagement means 141, and therefore forcing the dog clutch type selector 14 to rotate. Since the dog clutch type selector 14 is torque proof engaged with the prop shaft 10, prop shaft 10 also rotates.

When the inner part 112 is not engaged to the dog clutch type selector 14 the softer spring inside the divided bevel gear 11 is considered not to be deformed (the occurring deformation is negligible) and the stiffer spring is also not deformed since is "shorter" in relation to the softer spring and the deflection of the outer part of the divided bevel gear in relation to the inner part is negligible.

When the dog clutch type selector 14 begins to engage to the inner part 112 by the interaction of the engagement means 141 of the dog clutch type selector 14 with the engagement means 1121 of the inner part 112, the rotational force is transferred from the outer part to the softer elastic element and therefore the deformation of the softer spring begins, since it was considered not to be deformed. Due to the fact that the softer spring has a small spring constant the engagement takes place easily with a small demand in axial force. As it is obvious the softer spring is deformed initially and after the completion of the engagement, the deformation of the stiffer spring follows accompanied by the continuance in deformation of the softer spring. When the stiffer spring begins to bear load in a progressive manner, the substantial amount of power begins to be transferred. When the load is fully borne by the set of springs, both the inner part 112 and the outer part in will rotate with the same angular velocities, and so will the dog clutch type selector.

It is worth mentioning that the gear changing action is completed during the initial deformation of the softer spring element, before the beginning of the deformation of the stiffer elastic element.

Figure 3:
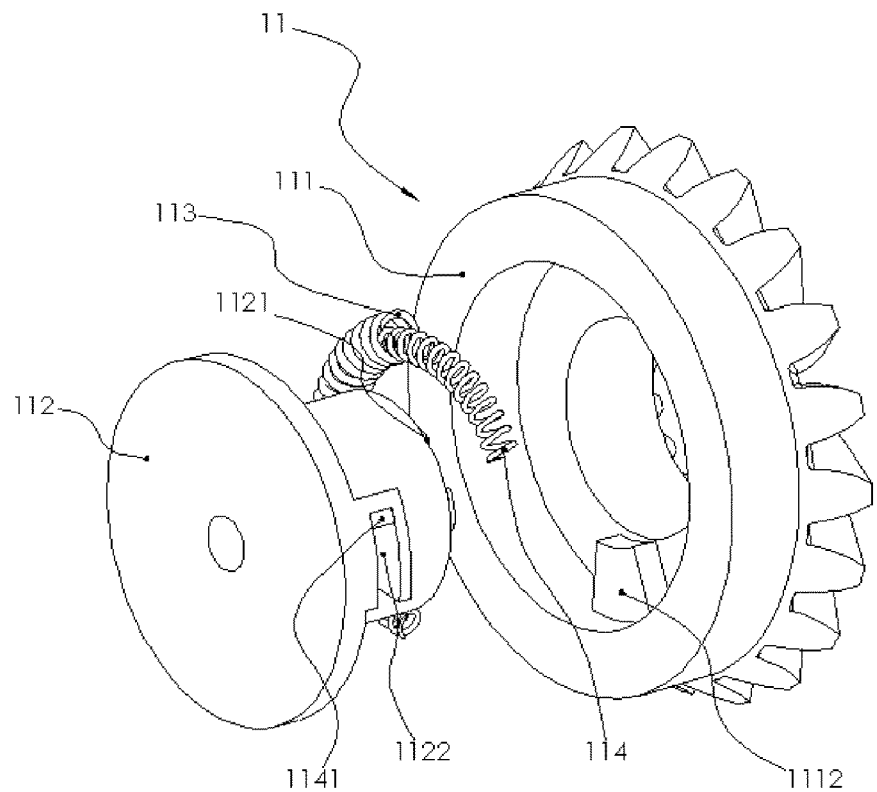
FIG. 3 individual parts of the power transmission system used in marine engines according to the first embodiment illustrated in FIG. 1.

FIG. 3 presents a more clear view of the divided bevel gear wheel 11. The divided bevel gear wheel 11 is consisted by an outer part 111, an inner part 112 and two springs in total positioned as one set of two, with softer spring 114 paired with stiffer spring 113. As mentioned before the stiffer element 113, does not have necessarily to be a spring element but can also be any type of elastic element such as a rubber block. In any case the softer element has to be a spring element and the two elements have to be positioned in a configuration which permits the softer spring to deform initially upon deflection of the outer part in relation to the inner part of the divided bevel gear. After the engagement is completed, the deformation of the stiffer elastic element follows, and is accompanied by a simultaneous deformation of the softer spring element that continuous to be deformed as the deflection progresses. In the presented layout only one set of two elastic elements is presented but more can be added with a corresponding change in both the inner and outer parts of the divided bevel gear wheel. In addition the presented layout positions the set of two elastic elements in a single compartment but each of the elastic elements consisting the set of two elastic elements, can be position in a separate compartment, with the divided bevel gear always operating as described.

As can be seen softer spring 114 has an increased length in comparison to the length of the stiffer spring 113, resulting in an initial deformation. Springs are supported by outer support 1112 positioned in the outer part in and inner support 1122 positioned in the inner part 112 of the divided gear wheel 11.

Outer support 1112 of the outer part 111 can be "sandwiched" in between inner support 1122 of the inner part 112 which have a suitable opening in between. In addition inner support 1122 has a back that stops outer support 1112 and as a result restricts the rotation range of the outer part 111. This back has a padding 1141 with a damping effect in order to prevent the fierce collision of the inner and outer parts, when the previously engaged inner part 112 is disengaged. It is going without saying that a padding with a damping effect can also be adopted in the outer support 1112 (in addition or instead of the padding of the inner support 1122).

The presented divided bevel gear wheel 11 has an analogous layout to the divided bevel gear wheel 12. As a consequence divided bevel gear 12 has an outer part 121 and an inner part 122 and two springs in total positioned as one set of two, with softer spring 124 paired with stiffer spring 123.

Again softer spring 124 have an increased length in comparison to the length of the stiffer spring 123. Similarly to FIG. 3, springs are supported by outer support 1212 positioned in the outer part 121 and inner support 1222 positioned in the inner part 122 of the divided gear wheel 12. Padding 1241 with a damping effect is analogously provided.

Figure 4:
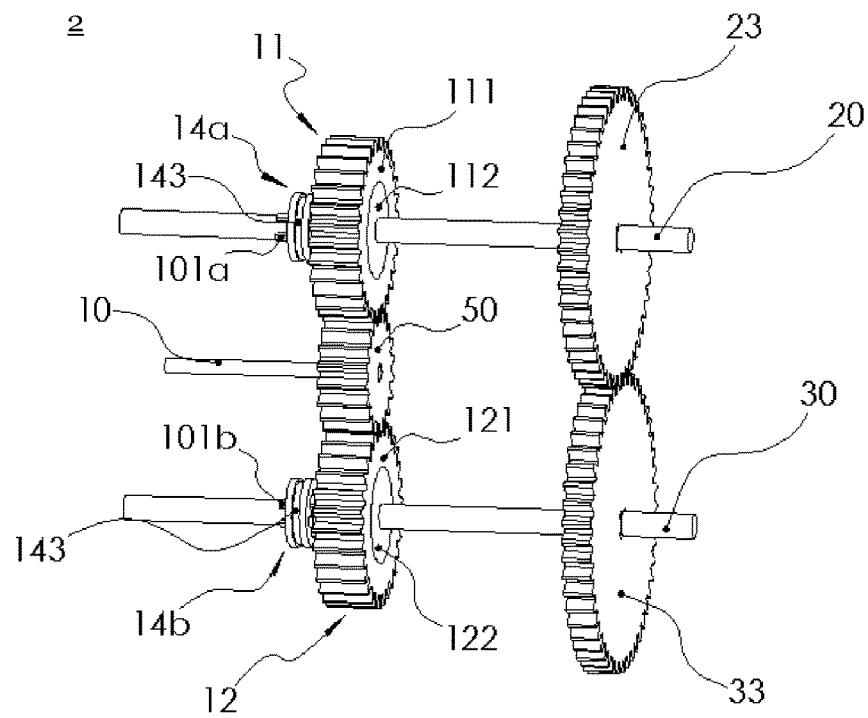
FIG. 4 is a schematic perspective view of a power transmission system used in marine engines according to an alternative embodiment of the invention.

FIG. 4 demonstrates an alternative configuration for an inboard power transmission system. In this alternative the engageable gear wheels are provided as divided gear wheels 11, 12 with their outer parts 112, 121 comprising a spur gear teething instead of a bevel gear teething.

In addition the divided gear wheels 11, 12 are supported by separate drive shafts 20, 30 and not by the same. Therefore, divided gear wheel 11 is supported by drive shaft 20 and divided gear wheel 12 is supported by drive shaft 30. In addition drive shaft 20 supports drive gear wheel 23 and drive shaft 30 supports gear wheel 33 which constantly meshes with the drive gear wheel 23. Both the drive gear wheel 23 and gear wheel 33 are torque proof fixed with their respective drive shafts 20, 30 (i.e. rotate as the respective shaft rotates).

As mentioned before divided gear wheels 11, 12 are free to rotate when their inner parts 111, 121 are not engaged by a dog clutch type selector 14. In this alternative each divided gear wheel 11, 12 has a separate dog clutch type selector 14 (14*a*, 14*b*) and the two do not share a single one as in the previously described configurations.

Similarly to the previously described configurations the dog clutch type selector 14 (now consisted by dog clutch type selector 14*a* and 14*b*), is torque proof fixed (i.e. rotating with the same angular velocity) with the assigned drive shaft 20, 30 but has the ability to move axially in relation to the main axis of the shaft, and the axial position is defined by the respective position of the throttle lever.

In this configuration the power is transferred from drive shaft 20, 30 to the inner parts 112, 122 of the divided gear wheels 11, 12 and via the set of two elastic elements to the outer parts 111, 121 of the divided gear wheels 11, 12. From there and since the outer parts 111, 121 are constantly meshed with gear wheel 50 which is torque proof fixed with the prop shaft 10, the power is transferred to the prop shaft.

In the previously described configurations the divided gear wheels 11, 12 were engaged to the drive gear wheel. In this alternative configuration both the divided gear wheels 11, 12 are constantly meshed with the provided gear wheel 50 that is torque proof fixed with prop shaft 10. In prop shaft 10 the propeller is torque proof fixed with to the one end of the shaft.

The operation of the alternative configuration is analogous to the one described in detail above. Therefore upon engaging the desired divided gear wheel 11, 12 the direction of rotation of gear wheel 50 changes and as a result a forwards or backwards movement can be achieved.

Figure 5:
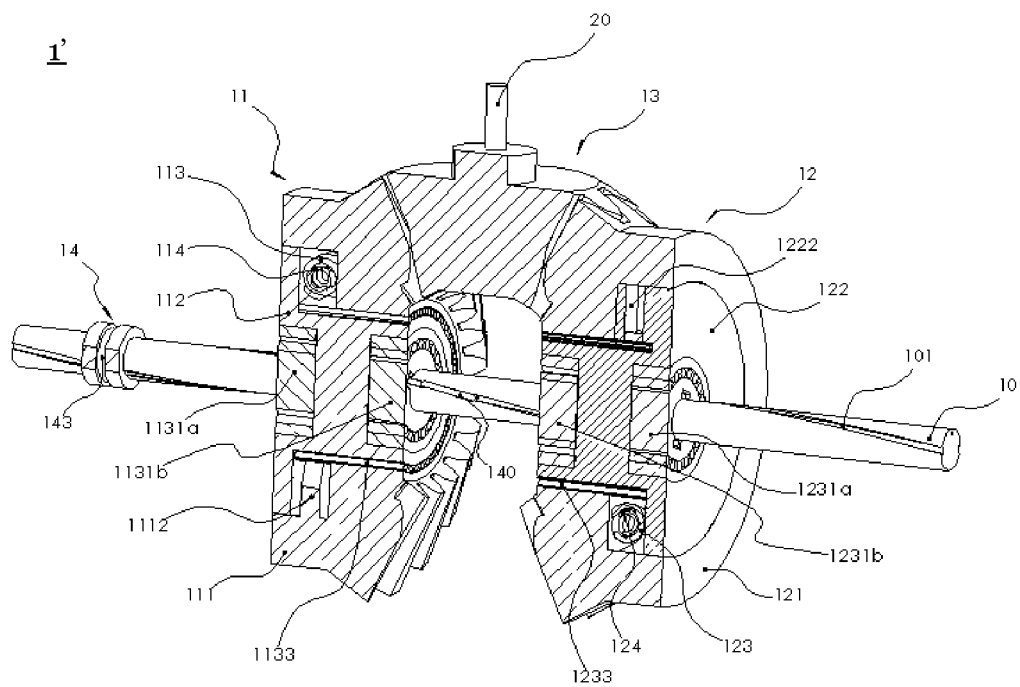
FIG. 5 is a schematic sectional view of a power transmission system used in marine engines according to an alternative embodiment of the invention.

FIG. 5 is an alternative configuration of the one presented in FIGS. 1 to 3. The main difference of this configuration in relation to the one presented above is that the dog clutch type selector is guided by helical means instead of the straight as in the previous, and that the engagement takes place in the inner circumferential surface of the inner part 112, 122 instead of the front face of said parts.

Therefore guiding means 101 have a helical shape and are integrally formed in the outer circumferential surface of prop shaft 10.

In addition instead of a dog clutch type selector, a different type of selector is adapted having the role of an engagement component. The selector is reshaped accordingly, with the engagement means 140 being at the distant end of selector arms. In comparison to the previously presented configuration in FIGS. 1 to 3, the engagement means 142, 141 are combined into a single element that engages both the divided bevel gear 11 and the divided bevel gear 12.

Furthermore the engagement of the inner parts 112 and 122 takes place on their inner circumferential surface, right on top of prop shaft 10. Therefor when the inner part 112 of the divided bevel gear 11 need to be engaged with the engagement means 140 of the dog clutch type selector 14, the engagement means 140 will firstly come through the provided cavities of the bearings 1131, 1231 and then will interact with the cavities of the inner part 112. The number of engagement means of the inner part 112 is purposely increased in relation to the provided engagement means 140 (the illustration depicts two engagement means 140) in order to facilitate the engagement of the components.

In the illustration none of the divided bevel gears 11, 12 is selected/engaged, and the engagement means 140 are positioned in between the divided bevel gears 11, 12 in a neutral position. When the throttle lever is moved (either forwards or backwards) and due to the fact that the dog clutch type selector has a gear selector coupling 143, the engagement means 140 will be moved either towards divided bevel gear 11 or towards divided bevel gear 12. As a result either the inner part 112 of the divided bevel gear 11 or the inner part 122 of the divided bevel gear 12 will be torque proof engaged with the prop shaft 10, with the desired gear change being completed when the engagement is completed by the initial deformation of the softer elastic element.

Since guiding means 101 have a helical shape, and dog clutch type selector 14 is guided by them, an additional (in relation to the angular velocity of prop shaft 10) angular velocity will be provided when the dog clutch type selector 14 is moved axially. As a result differences in angular velocities between the engaging components can be compensated, resulting in even quicker and smoother gear change.

In addition due to the fact that axial forces act to the dog clutch type selector 14, the dog clutch type selector has to be secured in position.

It is going without saying that the proposed alternative is operational even if the guiding means 101 are straight instead of the depicted helical.

Figure 6:
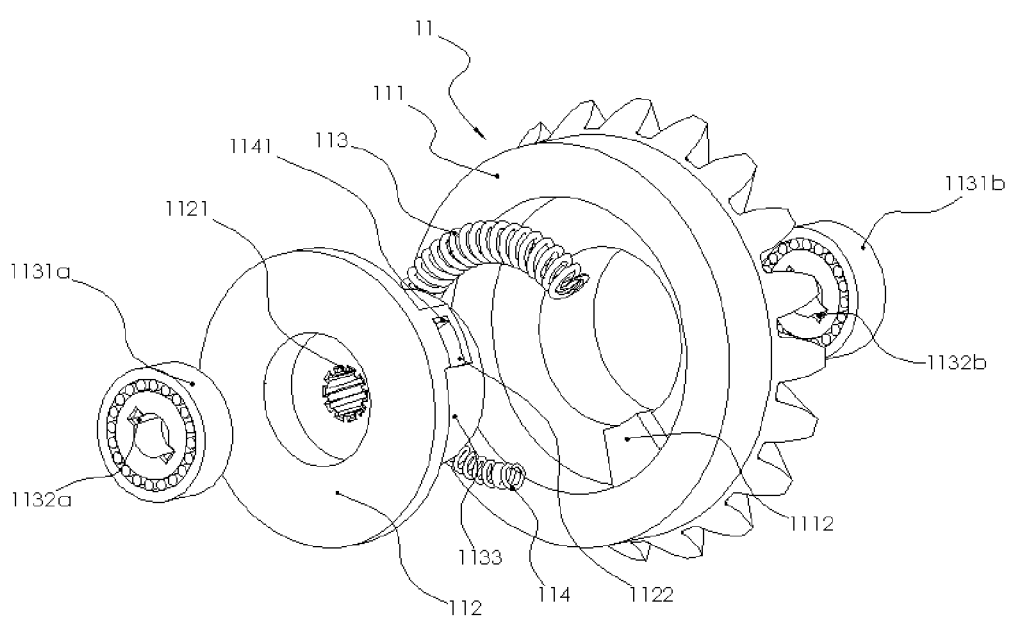
FIG. 6 individual parts of the power transmission system used in marine engines according to the alternative embodiment illustrated in FIG. 5.

FIG. 6 depicts separate parts in relation to the alternative configuration presented in FIG. 5.

In this figure a more clear view of the inner part 112 of the divided bevel gear 11 can be seen. As it is obvious the engagement means 1121 are provided on the inner circumferential surface of the inner part 112, directly above the prop shaft 10. Therefor as the dog clutch type selector 14 is moved axially, the engagement means 140 of the dog clutch type selector 14 can interact with the engagement means 1121, torque proof fixing inner part 112 with prop shaft 10.

In addition since the axial movement of the dog clutch type selector 14 encounters bearings 1131, cavities 1132 are provided. In addition, as mentioned above, the increased number of engagement means 1121 can be seen (in relation to the number of engagement means 140), which are formed with respect to the engagement means 140 of the dog clutch type selector 14. Therefore since the engagement means 140 of the dog clutch type selector have a helical form in this alternative, the engagement means 1121 of the inner part 112 of the divided bevel gear 11 will also have a helical form. The increased number of engagement means 1121 facilitate the engagement preventing any collision problems.

FIGS. 7A to 7F represent a gear changing action from neutral to forward and then to backward in relation to the embodiment presented in FIGS. 1 to 2.

Figure 7A:
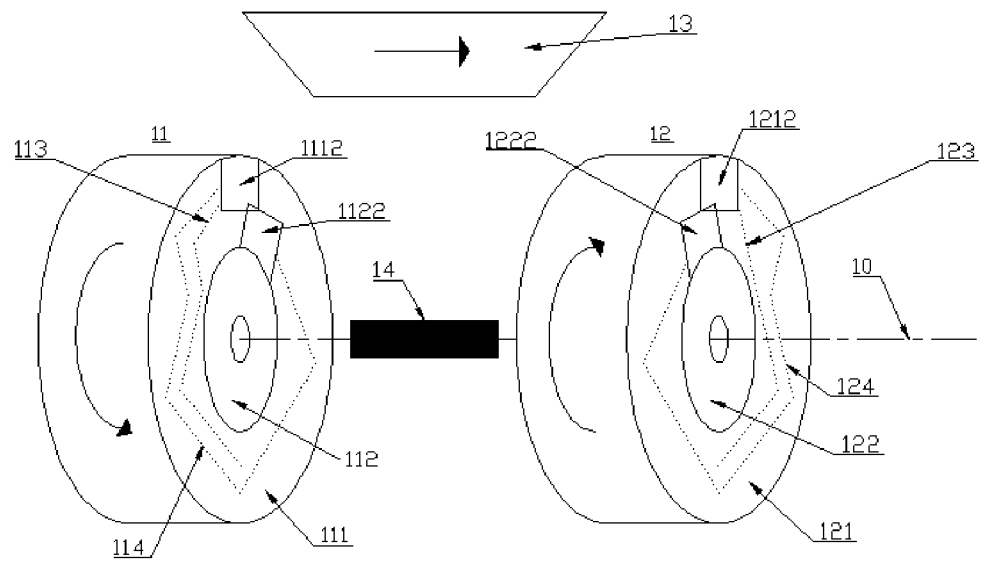
FIG. 7A to 7G give a schematic illustration of a gear changing action sequence.

Therefore in FIG. 7A the gear lever is positioned in neutral and therefore the dog clutch type selector 14 is positioned in between the divided bevel gears 11, 12 and none of the inner parts 112, 122 is torque proof engaged with the assigned prop shaft 10.

Bevel gears 11, 12 are meshed to bevel pinion 13 via their outer parts 111, 121. Elastic elements 114, 124 connect the inner parts 112, 122 and the outer parts 111, 121.

In addition inner supports 1122, 1222 support elastic elements 114, 124, and outer supports 1112, 1212 are provided supporting the elastic elements 113, 114, 123, 124.

The arrows provided in the figures show the direction of rotation of each of the divided bevel gears 11, 12, the direction of rotation of the assigned prop shaft 10, and the direction of rotation of the bevel pinion 13.

Figure 7B:
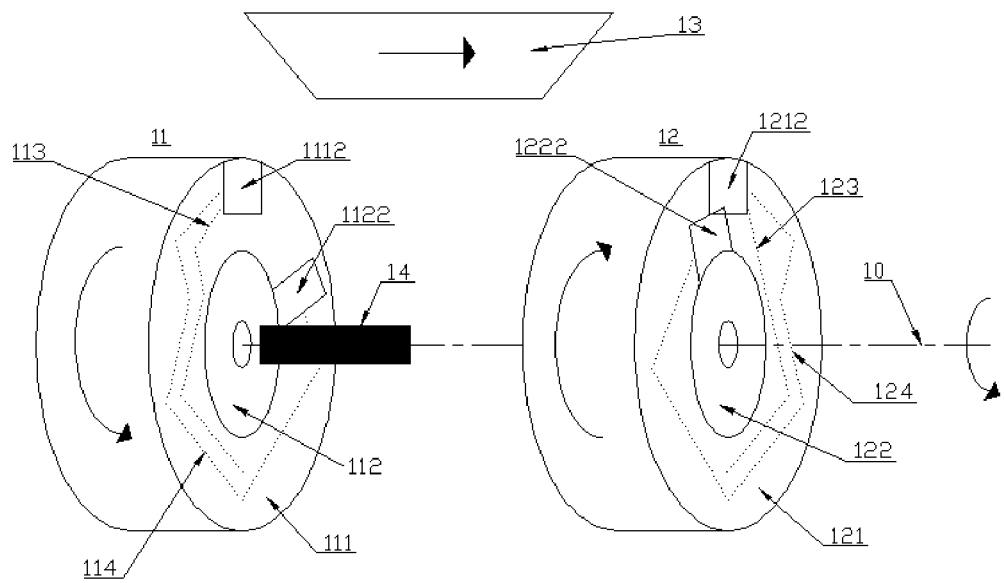

In FIG. 7B the selection of the first gear ratio which is assigned to a forward movement (divided bevel gear 11) begins. Dog clutch type selector 14 is axially moved towards the divided bevel gear 11 and the engagement means of the dog clutch type selector 14 interact with the engagement means of the inner part 112 of the divided bevel gear 11, and therefore the softer spring element begins to compress.

As a result of the beginning of the engagement, the inner part 112 of the divided bevel gear 11 rotates with fewer rotations in relation to the outer part in. The softer spring element compresses and the stiffer elastic element does not.

Figure 7C:
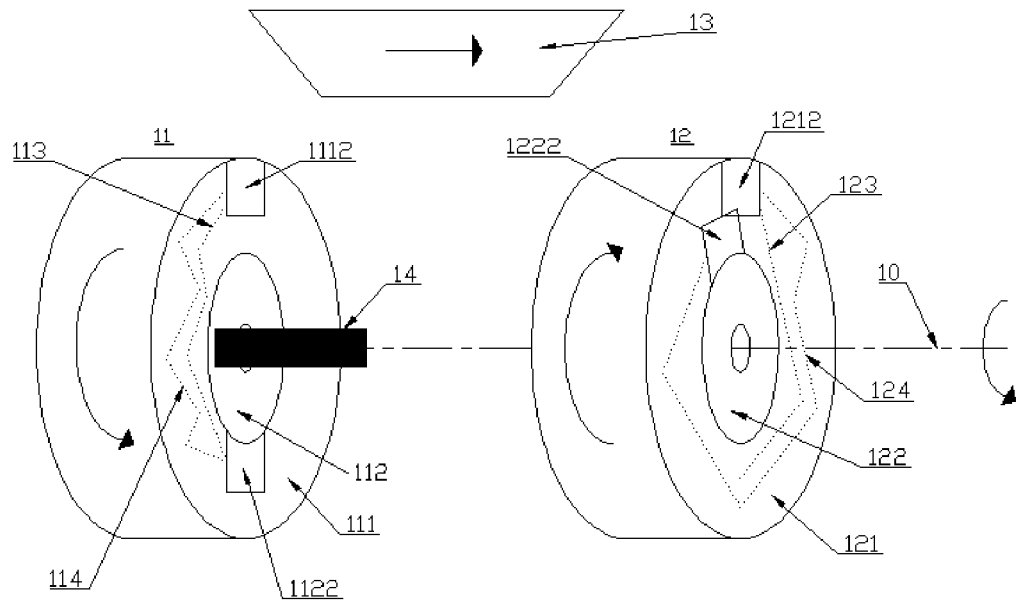

In FIG. 7C the engagement of divided bevel gear 11 has been completed and the softer spring element is compressed up till the stiffer elastic element is reached, due to the deflection of the components.

Progressively, the stiffer elastic element 113 compresses up till the entire occurring load is received by the element. Afterwards, when both the elastic elements 113, 114 are fully compressed under the occurring load, the inner part 112 and the outer part in of the divided bevel gear 11 have the same angular velocities in relation to each other and therefore rotate as one. Assigned prop shaft 10 has also the same angular velocity as the divided bevel gear 11.

Divided bevel gear 12 also rotate as one but the elastic elements 123, 124 are fully decompressed.

Figure 7D:
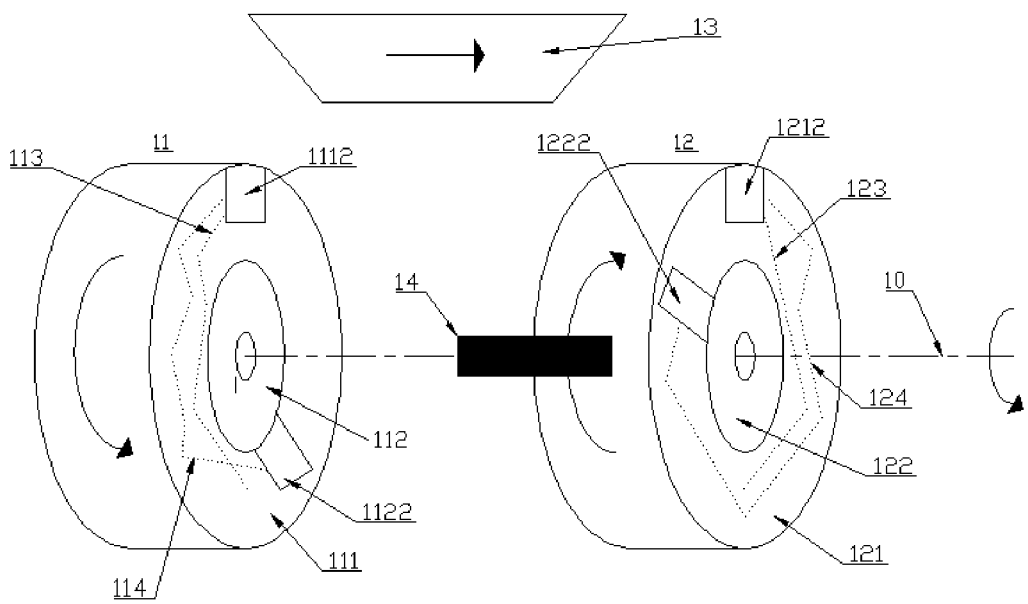

In FIG. 7D a reverse gear command is being given with divided bevel gear 11 being now disengaged and divided bevel gear 12 begins to be engaged with a corresponding movement of the gear lever and as a consequence with a corresponding movement of dog clutch type selector 14 towards the divided bevel gear 12.

Prop shaft 10 rotates as previously (direction is shown by the arrow) due to the inertia and the speed of the boat. The inner part 122 starts to be engaged by the dog clutch type selector 14 and as a result the softer spring element 124 inside the divided bevel gear 12 begins to compress and the assigned prop shaft 10 decelerates. Inner part 122 has a smaller angular velocity in relation to the angular velocity of the outer part 121.

Elastic elements 113, 114 decompress and the inner part 112 of the divided bevel gear 11 has an increased angular velocity in relation to the outer part 111.

Figure 7E:
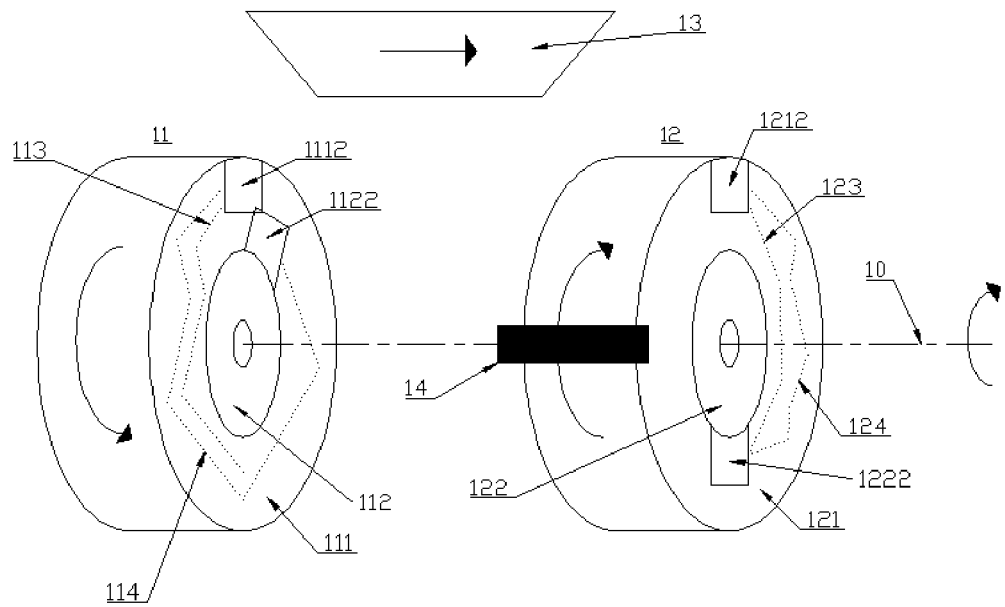

FIG. 7E shows that the reverse gear engagement has been completed by the engagement of the inner part 122 of the divided bevel gear 12 with the dog clutch type selector 14, and the elastic elements 123, 124 are fully loaded under the occurring load. Both the inner part 122 and the outer part 121 of the divided bevel gear 12 have the same angular velocity and so does the prop shaft 10.

Divided bevel gear 11 is not engaged with the dog clutch type selector 14 and the elastic elements 113, 114 are fully decompressed. The inner part 112 rotates with the same angular velocity as the outer part 111.

Figure 7F:
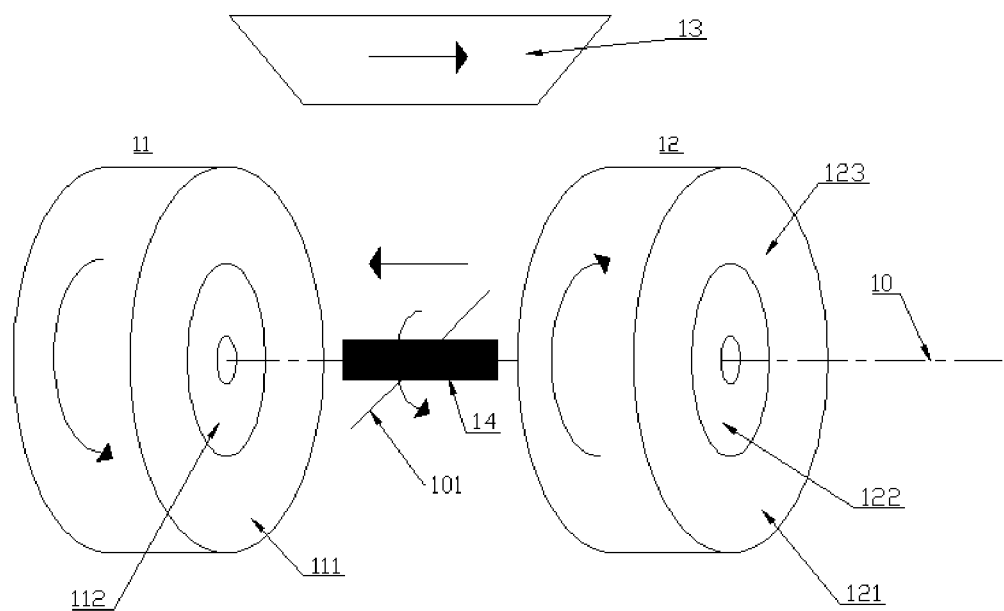
Figure 7G:
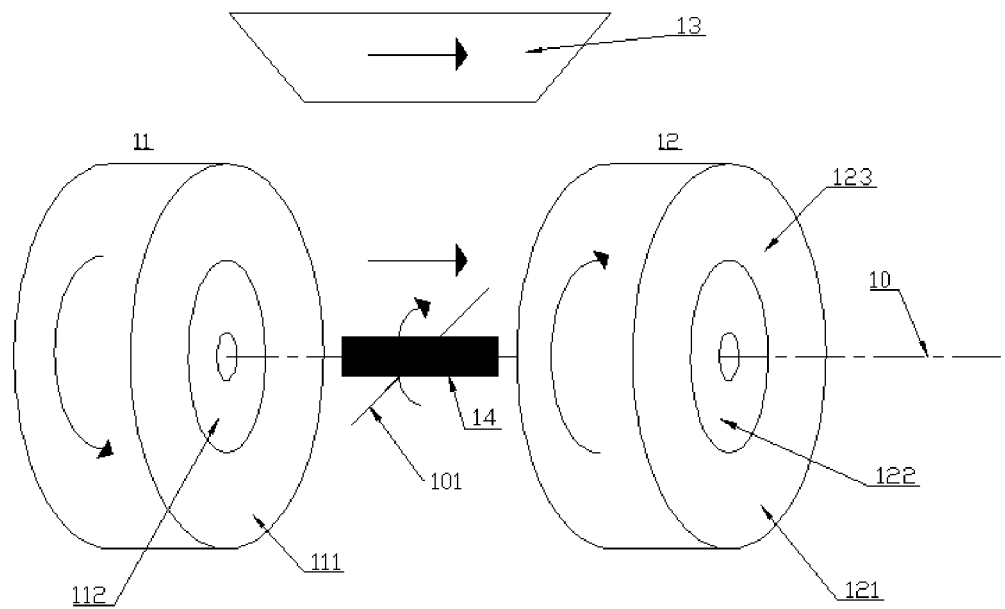

FIG. 7F and FIG. 7G show the relative rotational movement of the dog clutch type selector in relation to the axial movement of the dog clutch type selector 14, when helical guiding means 101 are adopted.

By the adaptation of helical guiding means 101, the dog clutch type selector 14 rotates in the same direction as the inner part of the divided bevel gear that is going to be engaged with.

In comparison the two additional rotational movements have an opposite direction of rotation in relation to each other but so do the divided bevel gears 11, 12 and therefore the desired feature is achieved, assisting with a smoother engagement.

In FIG. 7F the dog clutch type selector 14 is moved towards the divided gear wheel 11 and rotates as the divided gear wheel 11 and in FIG. 7G the dog clutch type selector 14 is moved towards the divided gear wheel 12 and rotates as the divided gear wheel 12.

Figure 8:
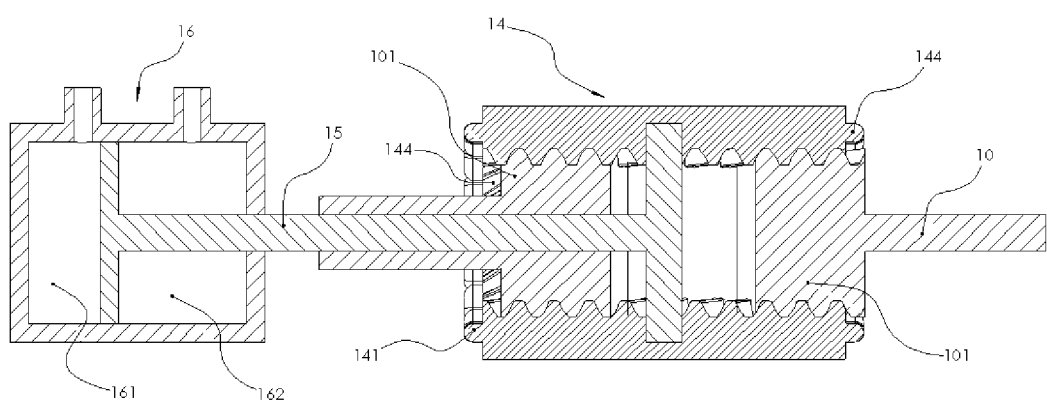
FIG. 8 is a schematic illustration of a gear shifting mechanism.

In FIG. 8 an exemplary gear shifting mechanism is presented.

The exemplary gear shifting mechanism is consisted by a gear shifter 15 that controls the position of the dog clutch type selector 14, and therefore the selected gear ratio. The axial movement of the gear shifter 15 is achieved with the help of a hydraulic cylinder 16, which is controlled by a solenoid valve.

When a first gear ratio is desired to be selected, the second chamber 162 is filled with pressurized hydraulic fluid, the dog clutch type selector is axially moved towards the first divided bevel gear 11, and the engagement means 141 of the dog clutch type selector 14, interact with the engagement means of the first divided gear wheel, torque proof fixing said divided gear wheel with the prop shaft 10 and therefore selecting the first gear ratio as described in detail above.

When the second gear ratio is desired, the first chamber 161 is filled with pressurized hydraulic fluid (with a corresponding emptying of the second chamber 162), dog clutch type selector 14 is axially moved and therefore engagement means 144 interact with the engagement means of the second divided gear wheel.

Dog clutch type selector 14 is guided by guiding means 101, positioned in the outer circumferential surface of the prop shaft 10, that are shaped as helixes with a corresponding change in the engagement surface 144 of the dog clutch type selector 14. Therefore the additional benefits described in detail above can be achieved.

It is going without saying that the use of the hydraulic cylinder 16 is not restrictive and other types of mechanisms that move the gear shifter 15 can be adapted (e.g. electric motor etc.). Furthermore the presented guiding means 101 have a helical form but the exemplary gear shifting mechanism can be adapted for any form of guiding means (e.g. straight guiding means). As it is obvious when straight guiding means are selected the dog clutch type selector does not have an additional angular velocity upon axial movement.

Figure 9:
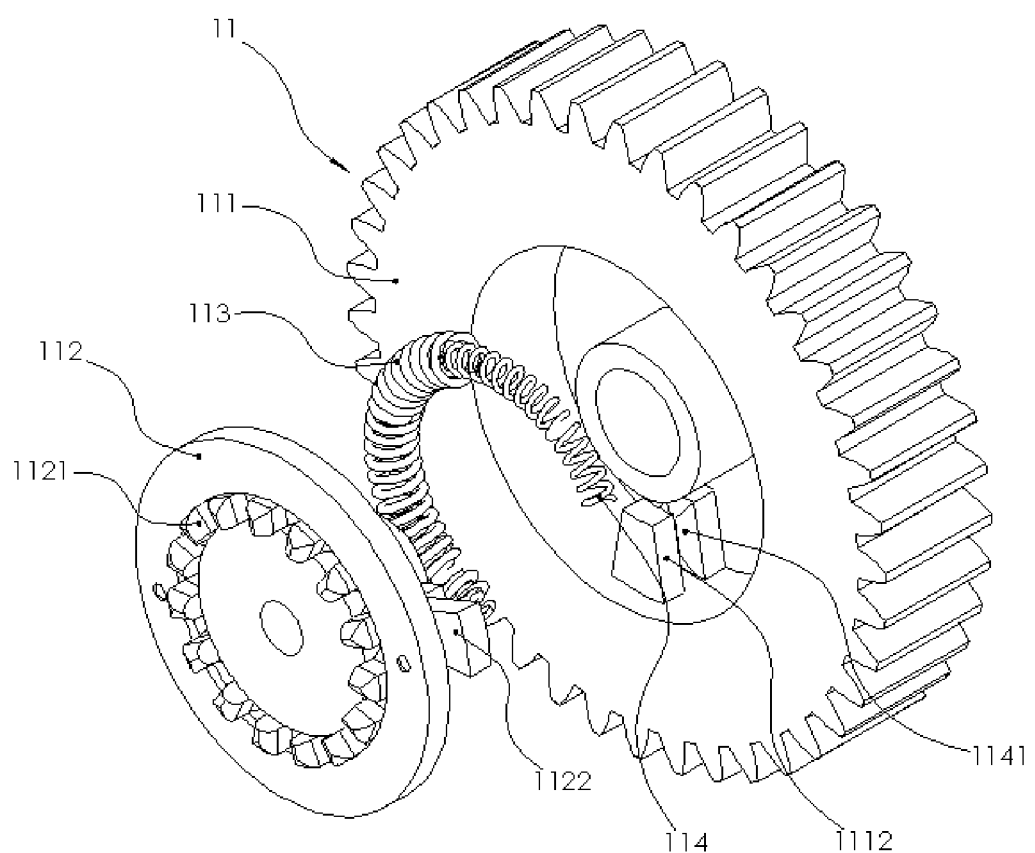
FIG. 9 individual parts of the power transmission system used in marine engines according to the alternative embodiment illustrated in FIG. 4.

In FIG. 9 presents an exploded view of the divided gear wheels used in the alternative configuration depicted in FIG. 4. More specifically the divided gear wheel 11 is presented and the figure is analogous to FIG. 3.

As can be seen the main difference in relation to the divided bevel gear presented in FIG. 3 is the outer part in that comprises a spur gear teething instead of a bevel gear teething. The teething of the outer part 111 is formed in relation and with respect to the meshed gear teething. In the alternative configuration presented in FIG. 4 the divided gear wheels 11, 12 mesh with gear wheel 50 that has a spur teething and therefore the presented divided gear wheel 11 comprises also a spur teething.

In addition the inner support 1122 does not comprise a back as previously. In order to eliminate the inner part oscillation, damping padding 1141 exists in the outer support 1112. As it is obvious the damping padding 1141 can exist in the inner support 1122 instead of the outer support 1112.

This damping padding 1141 eliminates the inner part oscillation, by "gripping" the inner support 1122 upon deflection.

The above described power transmission systems used in marine engines, comprising divided gears, allows for a smooth and quick gear change and for less gear wear.

The invention claimed is:

1. A divided gear wheel (11, 12) for a power transmission system in an inboard/outboard motor for a marine engine, wherein said divided gear wheel (11, 12) comprises:
   an inner part (112, 122) engageable with a shaft (10, 20); and
   an outer part (111, 121) comprising gear teeth adapted to engage a gear wheel (13, 50);
   wherein the inner part (112, 122) comprises engagement means (1121, 1221) adapted to engage the shaft (10, 20) so that wherein upon engagement, the inner part (112, 122) is torque proof engaged with the shaft (10, 20);
   wherein the inner part (112, 122) and the outer part (111, 121) comprise a common rotational axis, wherein the inner part (112, 122) is at least partially arranged within the outer part (111, 121) and is angularly deflectable with respect to the outer part (111, 121) around the common rotational axis;
   at least one set of two elastic elements (114, 124, 113, 123) coupling the inner part (112, 122) and the outer part (111, 121);
   wherein each set of two elastic elements (114, 124, 113, 123) is received within a compartment formed by the inner part (112, 122) and the outer part (111, 121), the inner part comprises at least one inner support, the outer part comprises at least one outer support, and the first elastic element is in constant contact with the inner support and the outer support;
   wherein each set of two elastic elements (114, 124, 113, 123) comprises a first elastic element with a first spring constant and a second elastic element with a second spring constant that is greater than the first spring constant, wherein the first elastic element initially deforms on angular deflection of either the inner part and the outer part, followed be deformation of the second elastic element and continued deformation of the first elastic element;

wherein the inner part (112, 122) and the outer part (111, 121) are adapted to rotate with the same angular speed when each set of two elastic elements (114, 124, 113, 123) is fully loaded.

2. The divided gear wheel (11, 12) for a power transmission system in an inboard/outboard motor for a marine engine according to claim 1, wherein at least one of the at least one inner support (1122, 1222) of the inner part (112, 122) and the at least one outer support (1112, 1212) of the outer part (111, 121) comprises a surface with a damping characteristic.

3. A power transmission system (1) for an inboard/outboard motor for a marine engine, comprising:
a drive shaft (20);
a drive gear wheel (13) torque proof fixed with the shaft (20);
a propeller shaft (10);
two divided gear wheels (11, 12) according to claim 1, wherein each of the two divided gear wheels (11, 12) constantly meshes with the drive gear wheel (13), thereby defining a forward gear ratio and a reverse gear ratio, wherein each divided gear wheel (11,12) is adapted to freely rotate when not engaged with the propeller shaft (10); and
an engagement component/dog clutch type selector (14) positioned concentrically to and torque proof fixed with the propeller shaft (10), wherein the engagement component/dog type clutch selector is axially movable along the propeller shaft (10) to select the forward gear ratio or the reverse gear ratio, and wherein the engagement component/dog clutch type selector is adapted to engage the inner part (112, 122) of the divided gear wheels (11, 12) and thereby torque proof fix the inner part (112, 122) with the propeller shaft (10).

4. A power transmission system (2) for an inboard/outboard motor for a marine engine, comprising:
a propeller shaft (10);
a gear wheel (50) torque proof fixed with the propeller shaft (10);
two drive shafts (20, 30) two drive gear wheels (23, 33), and two divided gear wheels (11, 12) according to claim 1, wherein one of the two drive gear wheels (23, 33) and one of the two divided gear wheels (11, 12) are torque proof fixed to each of the two drive shafts (20, 30);
wherein each of the two divided gear wheels (11, 12) constantly meshes with the gear wheel (50), thereby defining a forward gear ratio and a reverse gear ratio;
wherein each of the two divided gear wheels (11, 12) is adapted to freely rotate when not engaged with the corresponding drive shaft (20, 30); and
two engagement component/dog clutch type selectors, each engagement component/dog clutch type selector assigned to a corresponding drive shaft (20, 30) and a corresponding divided gear wheel (11, 12), wherein each engagement component/dog clutch type selector (14) is positioned concentrically on and torque proof fixed to its corresponding drive shaft (20, 30), is arranged axially movable along its corresponding drive shaft (20, 30) to select a forward gear ratio or a reverse gear ratio, and is adapted to engage the inner part (112, 122) of the divided gear wheel (11, 12) to thereby torque proof fix the inner part (112, 122) with the respective drive shaft (20, 30).

5. The power transmission system (1, 2) according to claim 3 or claim 4, wherein
axial movement of each of the engagement component/dog clutch type selectors (14) along its corresponding propeller shaft (10) or corresponding drive shaft (20, 30) is guided by guiding means (101), wherein the engagement component/dog clutch type selector (14) may be rotated in relation to the assigned propeller shaft (10) or the assigned drive shaft (20, 30) when the engagement component/dog clutch type selector (14) is axially moved.

6. The power transmission system (1, 2) according to claim 3 or claim 4, wherein the engagement component/dog clutch type selector (14) comprises engagement means (140, 141, 144) facing the assigned divided gear wheel (11, 12) and engaging the engagement component/dog clutch type selector (14) with the inner parts (112, 122), wherein upon engagement the inner part (112, 122) is torque proof engaged with the assigned propeller shaft (10) or the assigned drive shaft (20, 30).

7. The power transmission system (1, 2) according to claim 3 or claim 4, further comprising a mechanical, electrical or hydraulic gear shifting mechanism that is actuated by a gear shifting lever and is adapted to axially move the at least one engagement component/dog clutch type selector (14), thereby selecting or deselecting the desired divided gear wheel (11, 12) by engaging or disengaging the inner part (112, 122).

8. A method for operating a power transmission system (1, 2) according to claim 3 or claim 4, the method comprising:
rotating the drive shaft (20, 30) to transfer power to the propeller shaft (10) through the forward gear ratio;
changing from the forward gear ratio to the reverse gear ratio;
axially moving the respective engagement component/dog clutch type selector (14) and thereby disengaging the inner part (112, 122) of the divided gear wheel (11, 12) of the forward gear ratio from the assigned prop propeller shaft (10) or the assigned drive shaft (20, 30), and engaging the inner part (112, 122) of the divided gear wheel (11, 12) of the reverse gear ratio, thereby torque proof fixing said inner part (112, 122) with the assigned propeller shaft (10) or the assigned drive shaft (20, 30), wherein the inner part (112, 122) of the divided gear wheel (11, 12) of the second gear ratio is angularly deflected with respect to the outer part (111, 121) and each set of two elastic elements (114, 124, 113, 123) is loaded as a result of the deflection; and
transferring power to the propeller shaft (10) through the reverse gear ratio.

9. The method according to claim 8, wherein during axially moving, the engagement component/dog clutch type selector (14) is guided by helical means and rotates in relation to the assigned propeller shaft (10) or the assigned drive shaft (20, 30) to compensate for the difference in angular velocity between the assigned propeller shaft (10) or the assigned drive shaft (20, 30) and the divided gear wheel (11, 12) to be engaged.

10. A boat comprising an inboard/outboard motor comprising at least one divided gear wheel (11, 12) according to claim 1.

* * * * *